United States Patent
Bellinger et al.

(10) Patent No.: US 12,055,909 B2
(45) Date of Patent: Aug. 6, 2024

(54) NIGHT CYCLE ALGORITHM FOR A LAUNDRY APPLIANCE TO MINIMIZE OPERATIONAL NOISE

(71) Applicant: WHIRLPOOL CORPORATION, Benton Harbor, MI (US)

(72) Inventors: Ryan R. Bellinger, St. Joseph, MI (US); Matthew Edward Borgerson, St. Joseph, MI (US)

(73) Assignee: WHIRLPOOL CORPORATION, Benton Harbor, MI (US)

( * ) Notice: Subject to any disclaimer, the term of this patent is extended or adjusted under 35 U.S.C. 154(b) by 301 days.

(21) Appl. No.: 17/366,161

(22) Filed: Jul. 2, 2021

(65) Prior Publication Data

US 2023/0004135 A1 Jan. 5, 2023

(51) Int. Cl.
*H04L 12/28* (2006.01)
*G05B 19/042* (2006.01)
*D06F 101/20* (2020.01)
*D06F 103/38* (2020.01)
*D06F 105/00* (2020.01)

(52) U.S. Cl.
CPC ...... *G05B 19/0426* (2013.01); *D06F 2101/20* (2020.02); *D06F 2103/38* (2020.02); *D06F 2105/00* (2020.02); *G05B 2219/2633* (2013.01)

(58) Field of Classification Search
CPC ........ G05B 19/0426; G05B 2219/2633; D06F 2101/20; D06F 2103/38; D06F 2105/00; D06F 33/48; D06F 2101/14; D06F 2105/02; D06F 2105/26; D06F 2105/58; D06F 33/32; D06F 2105/30; D06F 2105/46; D06F 2105/48; D06F 2105/60

USPC ......................................................... 700/275
See application file for complete search history.

(56) References Cited

U.S. PATENT DOCUMENTS

| | | | |
|---|---|---|---|
| 5,808,278 A * | 9/1998 | Moon ................ | G05B 19/0426 |
| | | | 219/415 |
| 9,109,318 B2 | 8/2015 | Kulkarni et al. | |
| 9,416,475 B2 | 8/2016 | Kulkarni | |
| 11,286,610 B2 | 3/2022 | Lee et al. | |
| 2011/0099731 A1* | 5/2011 | Im ........................ | D06F 33/32 |
| | | | 8/137 |
| 2012/0304396 A1* | 12/2012 | Dale ..................... | D06F 25/00 |
| | | | 68/12.15 |
| 2015/0069933 A1* | 3/2015 | Ragogna ............... | D06F 33/32 |
| | | | 68/12.02 |
| 2016/0261425 A1* | 9/2016 | Horton ................. | H04L 67/1097 |

(Continued)

FOREIGN PATENT DOCUMENTS

| | | | | |
|---|---|---|---|---|
| DE | 102004039435 A1 * | 2/2006 | .......... | D06F 39/005 |
| EP | 0543166 A1 | 5/1993 | | |

(Continued)

*Primary Examiner* — Suresh Suryawanshi
(74) *Attorney, Agent, or Firm* — PRICE HENEVELD LLP (57) ABSTRACT

A laundry dryer includes a cabinet, a user interface that is operably coupled to the cabinet, a motor that is disposed within the cabinet and communicatively coupled with the user interface, and a controller that is communicatively coupled with the user interface and the motor, respectively. The controller includes a memory storage that includes a plurality of night routines. The controller is configured with a selectable time point and is further configured to select at least one of the plurality of night routines at the selectable time point.

18 Claims, 9 Drawing Sheets

(56) References Cited

U.S. PATENT DOCUMENTS

| | | | |
|---|---|---|---|
| 2020/0157731 A1* | 5/2020 | Del Puppo | ............... D06F 58/38 |
| 2020/0181830 A1 | 6/2020 | Jang et al. | |
| 2020/0190725 A1 | 6/2020 | Lee et al. | |
| 2020/0190726 A1 | 6/2020 | Jang et al. | |
| 2021/0117654 A1* | 4/2021 | Arankalle | ........... G06Q 20/0855 |
| 2021/0187559 A1* | 6/2021 | Kim | ........................ B08B 3/02 |
| 2022/0290354 A1 | 9/2022 | Lee et al. | |

FOREIGN PATENT DOCUMENTS

| | | | | |
|---|---|---|---|---|
| EP | 1887443 A1 * | 2/2008 | ......... | A47L 15/0052 |
| EP | 2025800 A1 | 2/2009 | | |
| EP | 2149635 A1 | 2/2010 | | |
| EP | 2278422 B1 | 5/2013 | | |
| EP | 2845943 A1 * | 3/2015 | ............. | D06F 33/00 |
| EP | 3106560 A1 | 12/2016 | | |
| EP | 3124689 A1 | 2/2017 | | |
| EP | 3124690 A1 * | 2/2017 | ............. | D06F 58/28 |
| EP | 3124690 A1 | 2/2017 | | |
| EP | 3124680 B1 | 6/2018 | | |
| EP | 2920354 B1 | 6/2020 | | |
| EP | 3666958 A1 | 6/2020 | | |
| EP | 3396051 A1 | 6/2022 | | |
| JP | 2008183087 A * | 8/2008 | | |

* cited by examiner

NIGHT CYCLE ALGORITHM FOR A LAUNDRY APPLIANCE TO MINIMIZE OPERATIONAL NOISE

BACKGROUND OF THE DISCLOSURE

The present disclosure generally relates to a laundry appliance, and more specifically, to a night cycle algorithm for a laundry appliance.

SUMMARY OF THE DISCLOSURE

According to one aspect of the present disclosure, a laundry appliance includes a cabinet that includes a user interface, a drum that is disposed within the cabinet, a motor that is disposed within the cabinet and is operably coupled to the drum, and a controller that is communicatively coupled with the user interface and the motor. The controller includes a night cycle algorithm that is configured to minimize operational noise of the motor and the drum. The controller is configured to select from a plurality of routines of the night cycle algorithm.

According to another aspect of the present disclosure, a laundry dryer includes a cabinet, a user interface that is operably coupled to the cabinet, a motor that is disposed within the cabinet and communicatively coupled with the user interface, and a controller that is communicatively coupled with the user interface and the motor, respectively. The controller includes a memory storage that includes a plurality of night routines. The controller is configured with a selectable time point and is further configured to select at least one of the plurality of night routines at the selectable time point.

According to yet another aspect of the present disclosure, a method for operating a laundry appliance includes selecting a night cycle of a memory storage via a controller, and adjusting a laundry cycle of the memory storage to the night cycle via the controller. Adjusting the laundry cycle to the night cycle includes activating at least one night routine. The method further includes disabling audio indicators via the controller including at least one of an end of cycle alert and remote notifications, and activating at least one of the night routines. The night routines include at least one of detecting a high water condition, reducing motor speed, and reducing alteration of motor activation.

These and other features, advantages, and objects of the present disclosure will be further understood and appreciated by those skilled in the art by reference to the following specification, claims, and appended drawings.

The components in the figures are not necessarily to scale, emphasis instead being placed upon illustrating the principles described herein.

DETAILED DESCRIPTION

The present illustrated embodiments reside primarily in combinations of method steps and apparatus components related to a night cycle algorithm for a laundry appliance. Accordingly, the apparatus components and method steps have been represented, where appropriate, by conventional symbols in the drawings, showing only those specific details that are pertinent to understanding the embodiments of the present disclosure so as not to obscure the disclosure with details that will be readily apparent to those of ordinary skill in the art having the benefit of the description herein. Further, like numerals in the description and drawings represent like elements.

Figure 1:
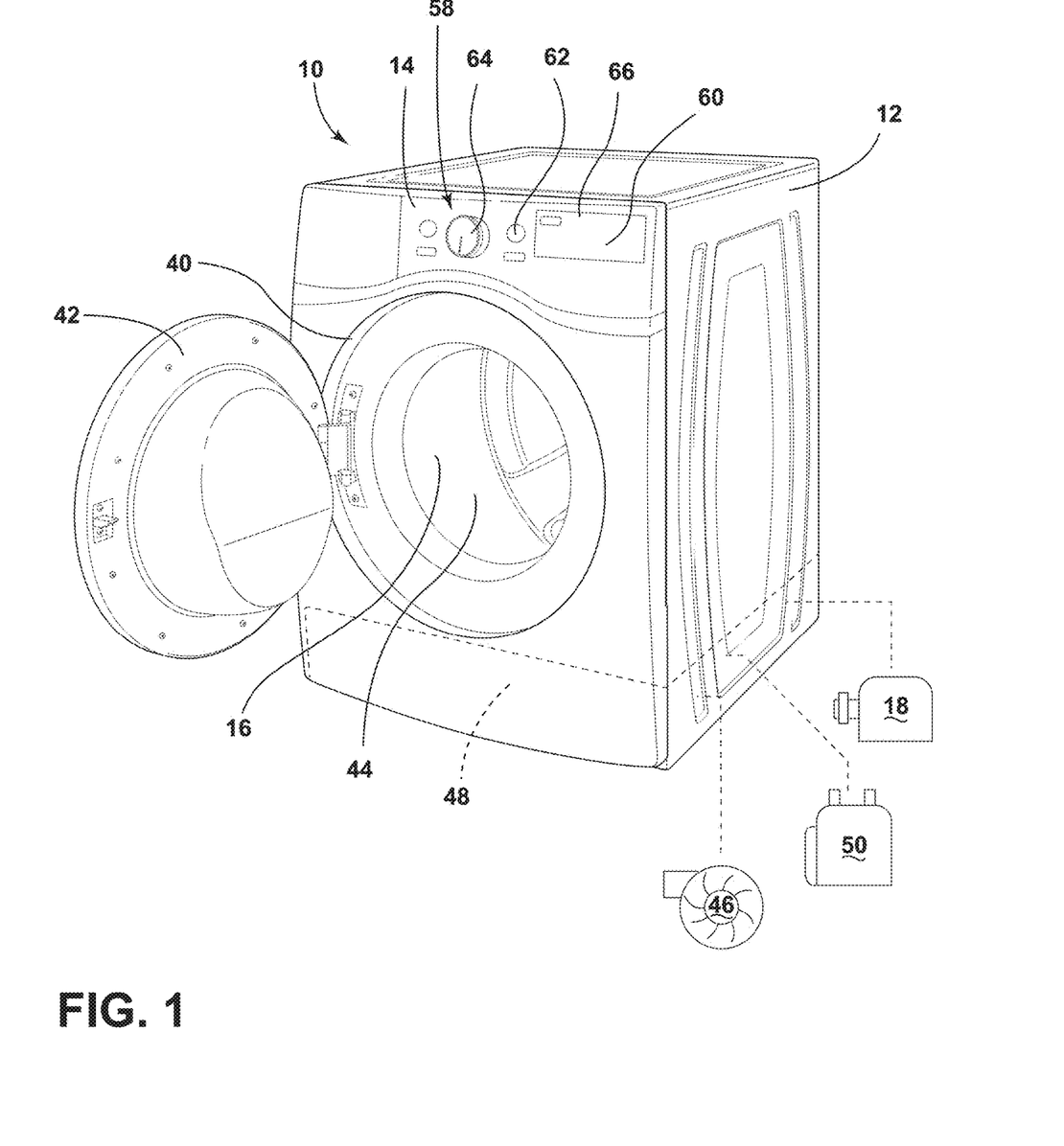
FIG. 1 is a front perspective view of a laundry appliance of the present disclosure.

For purposes of description herein, the terms "upper," "lower," "right," "left," "rear," "front," "vertical," "horizontal," and derivatives thereof shall relate to the disclosure as oriented in FIG. 1. Unless stated otherwise, the term "front" shall refer to the surface of the element closer to an intended viewer, and the term "rear" shall refer to the surface of the element further from the intended viewer. However, it is to be understood that the disclosure may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

The terms "including," "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises a . . . " does not, without more constraints, preclude the existence of additional identical elements in the process, method, article, or apparatus that comprises the element.

Referring to FIGS. 1-10, reference numeral 10 generally designates a laundry appliance including a cabinet 12. The cabinet 12 includes a user interface 14, and a drum 16 is disposed within the cabinet 12. A motor 18 is disposed within the cabinet 12 and is operably coupled to the drum 16. A controller 20 is communicatively coupled with the user interface 14 and the motor 18. The controller 20 includes a night cycle algorithm 22 configured to minimize operational noise of the motor 18 and the drum 16. The controller 20 is configured to select from a plurality of routines 24 of the night cycle algorithm 22.

Figure 2:
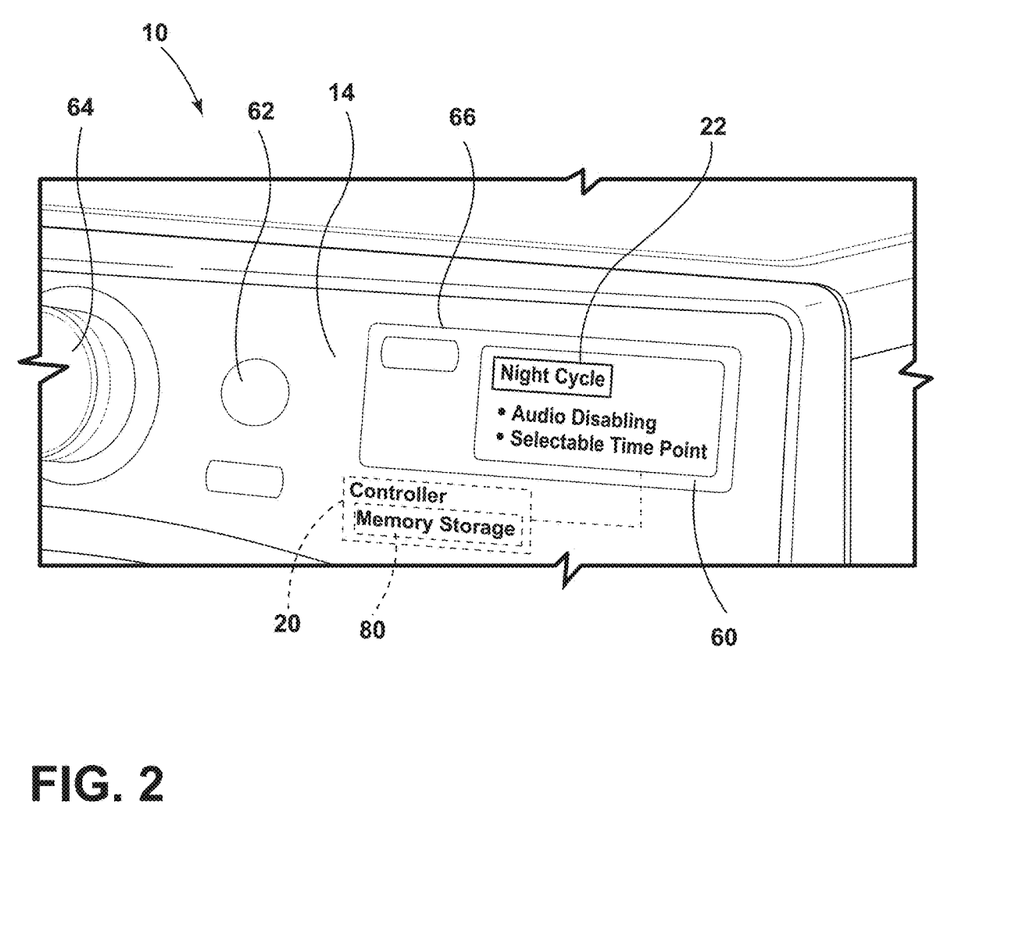
FIG. 2 is an enlarged front perspective view of a user interface of the present disclosure presenting a night cycle and various night routines.
Figure 3:
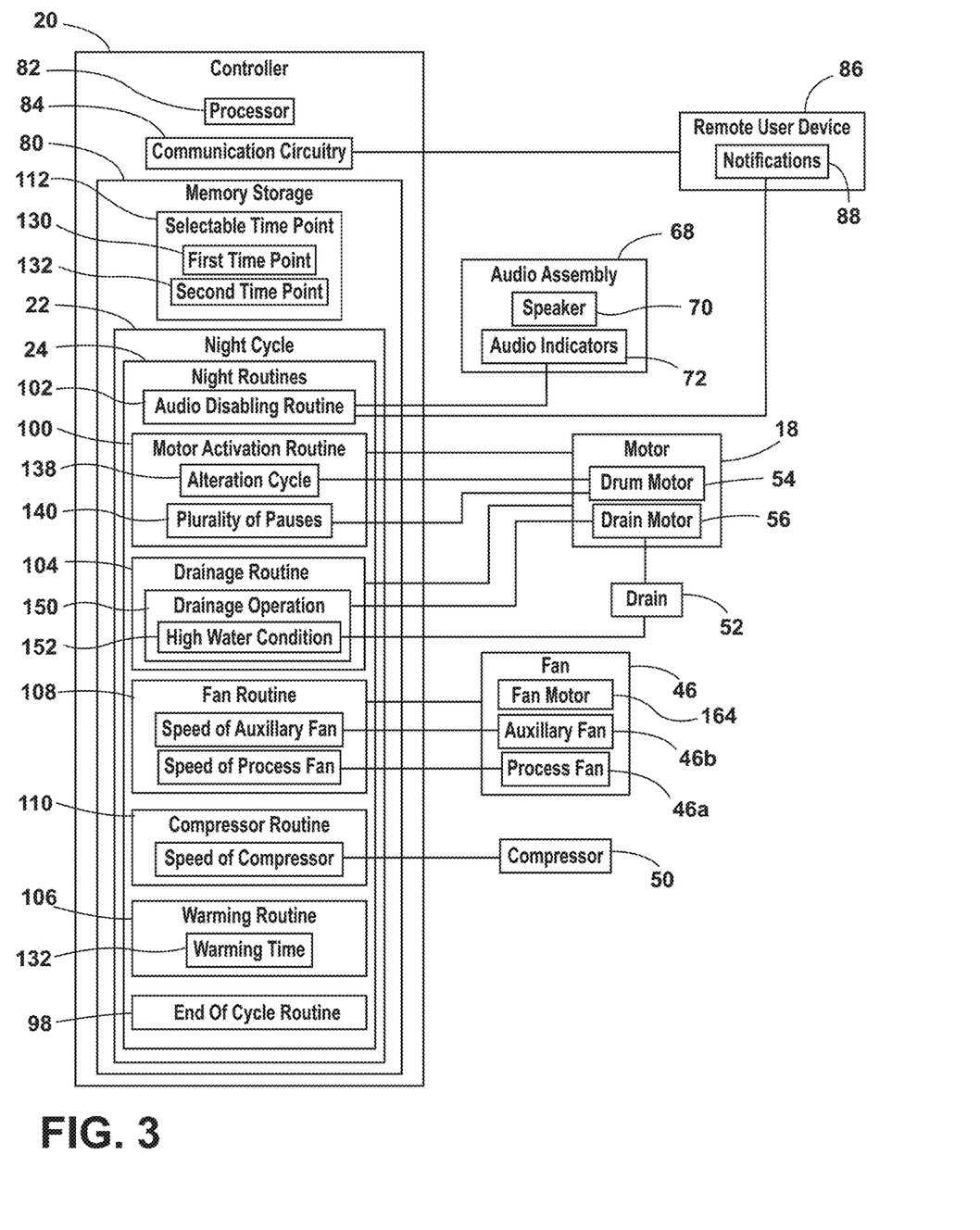
FIG. 3 is an exemplary schematic block diagram of a controller with a plurality of routines of the present disclosure.

Referring now to FIGS. 1-3, the laundry appliance 10 is illustrated as a dryer having a front panel 40 on which the user interface 14 is disposed. It is generally contemplated that the laundry appliance 10 may be referred herein to as a laundry dryer. The laundry appliance 10 includes a door 42 operably coupled to the cabinet 12 to provide selective access to a laundry cavity 44 defined by the drum 16. The drum 16 is disposed within the cabinet 12 proximate to the door 42 and defines the laundry cavity 44. It is generally contemplated that a fan 46 may be positioned proximate the drum 16 and is configured to direct process air into the laundry cavity 44. The fan 46 may include a processor fan 46a and/or an auxiliary fan 46b depending on the configuration of the laundry appliance 10. For example, the auxiliary fan 46b may be configured to assist in maintaining a temperature during the night cycle 22, described further herein. Additionally or alternatively, the auxiliary fan 46b may be configured to cool a heat pump system, while the processor fan 46a is configured to cool a condenser in particular configurations of the laundry appliance 10. The fan 46 may also cooperate with a blower of the laundry appliance 10 to assist in temperature regulation during operation of the night cycle 22. The cabinet 12 of the laundry appliance 10 also defines a machine compartment 48, which may be concealed by the front panel 40, in which the fan 46 and the motor 18 may be disposed. In addition to the motor 18 and the fan 46, it is also contemplated that a compressor 50 and a drain 52 may be disposed within the machine compartment 48.

It is contemplated that the motor 18 may be coupled to the drain 52, which is configured to remove a liquid that may collect within the laundry appliance 10 during operation. The motor 18 is also operably coupled with, at least, the drum 16 and is communicatively coupled with the controller 20, as mentioned herein. It is further contemplated that the motor 18 may be operably coupled to the drain 52 and may include a drum motor 54 and a drain motor 56. The drum motor 54 is configured to alter the speed and/or rotation of the drum 16, and the drain motor 56 is configured to selectively drain the water from the laundry appliance 10 via the drain 52. The drain motor 56 may be operably coupled to the drain 52. It is generally contemplated that the compressor 50 may also be coupled with the motor 18 when the laundry appliance 10 is configured to utilize the compressor 50. Additionally or alternatively, the motor 18 may be internal to the compress 50, such that the compressor 50 and the motor 18 may be combined into a singular unit. As described further herein, the motor 18 and the compressor 50 may be configured with a soft start option to minimize the noise associated with operating the compressor 50 and/or the motor 18.

With further reference to FIGS. 1-3, the front panel 40 of the cabinet 12 also includes the user interface 14, which is illustrated with various tactile indicia 58. The tactile indicia 58 may include a touchscreen 60, buttons 62 disposed along the user interface 14, and/or a knob 64 proximate to the buttons 62. It is contemplated that the user interface 14 also includes a display 66, which may include the touchscreen 60, to assist a user in selecting a laundry cycle. Additionally or alternatively, the laundry cycle may be selected via the knob 64 that can be communicatively coupled with the controller 20. The controller 20 is configured with various laundry cycle algorithms. The laundry cycle algorithms may include, but are not limited to, day time cycles, time-saving cycles, and/or the night cycle algorithm 22. As discussed herein, the night cycle algorithm 22 may be referred to as the night cycle 22, described in detail below.

The user interface 14 can also be operably coupled with an audio assembly 68, which may include a speaker 70. The speaker 70 is configured to project audio indicators 72 of the laundry appliance 10. It is generally contemplated that the audio indicators 72 may be associated with at least any one of cycle alerts, manipulation of the tactile indicia 58, and/or notifications associated with a laundry cycle. For example, the audio indicators 72 may project from the speaker 70 as the user manipulates the knob 64 and/or the buttons 62 of the tactile indicia 58. Additionally or alternatively, the speaker 70 may project the audio indicators 72 in association with an end of cycle alert 74 of the laundry appliance 10. The audio indicators 72 may be configured to alert the user when the laundry cycle is complete. Various haptic feedback can also be incorporated to operate with the various interface features of the user interface 14.

With further reference to FIGS. 1-3, the user interface 14 may include the display 66 on which the various laundry cycles of the laundry appliance 10 may be displayed. The user may select the night cycle 22 via at least one of the tactile indicia 58, and the display 66 can indicate the selection of the night cycle 22. It is also contemplated that upon selection of the night cycle 22, the display 66 may present various options in the form of the plurality of routines 24 configured within the night cycle algorithm 22. The user may select at least one of the plurality of routines 24 via the tactile indicia 58 disposed on the user interface 14. As mentioned above, the controller 20 is configured to include or have access to the plurality of routines 24 of the night cycle 22, such that the plurality of routines 24 are executed by the controller 20.

Referring still to FIGS. 1-3, the controller 20 includes a memory storage 80 in which the various laundry cycle algorithms, including the night cycle 22, may be stored. For example, the memory storage 80 includes the night cycle 22 and the corresponding plurality of routines 24. The controller 20 may also be configured with a processor 82 and other control circuitry. The plurality of routines 24 are stored within the memory storage 80 and executed by the processor 82. The other control circuitry of the controller 20 may include communication circuitry 84 for bidirectional communication. For example, the controller 20 may be communicatively coupled with a remote user device 86 via the communication circuitry 84. It is generally contemplated that the remote user device 86 may receive remote notifications 88 from the controller 20 via the communication circuitry 84 and a communication interface. While the memory storage 80 can be included within the controller 20, cloud storage or other remotely accessible memory interface can also be used instead of or in combination with the memory storage 80.

The communication interface may be a wireless interface, such that the laundry appliance 10 and the remote user device 86 are configured to emit wireless signals. The communication interface may correspond to a variety of communication protocols configured to distribute data among various electronic devices. For example, the communication interface may include an IEEE 802.11 connection, an IEEE 802.15 connection, a Bluetooth® connection, a Wi-Fi connection, a WiMAX connection, cellular signal, signal using shared wireless access protocol cord axis (SWAP-CA), or any other type of radiofrequency or wireless signal. An IEEE 802.15 connection includes any wireless personal area networks (WPAN), such as ZigBee®, Z-wave®, Bluetooth®, UWB, and IrDA. In this way, the communication interface may provide for data communication between the controller 20 and the remote user device 86. The remote user device 86 may be, for example, a phone, a tablet, a computer, a wearable device, or other electronic devices.

Figure 6:
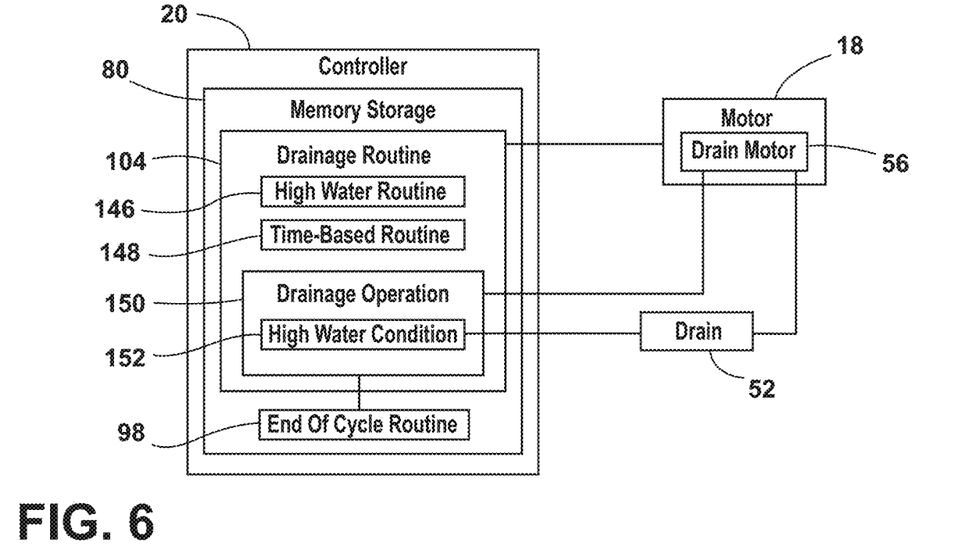
FIG. 6 is an exemplary schematic block diagram of a controller with a high water routine of a night cycle algorithm of the present disclosure.
Figure 7:
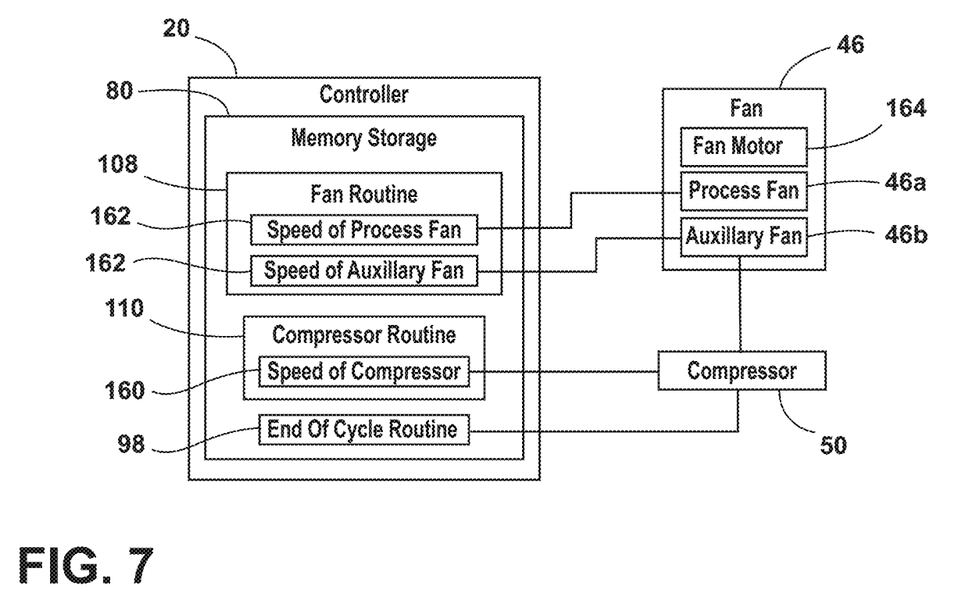
FIG. 7 is an exemplary schematic block diagram of a controller with a fan routine and a compressor routine of a night algorithm of the present disclosure.
Figure 8:
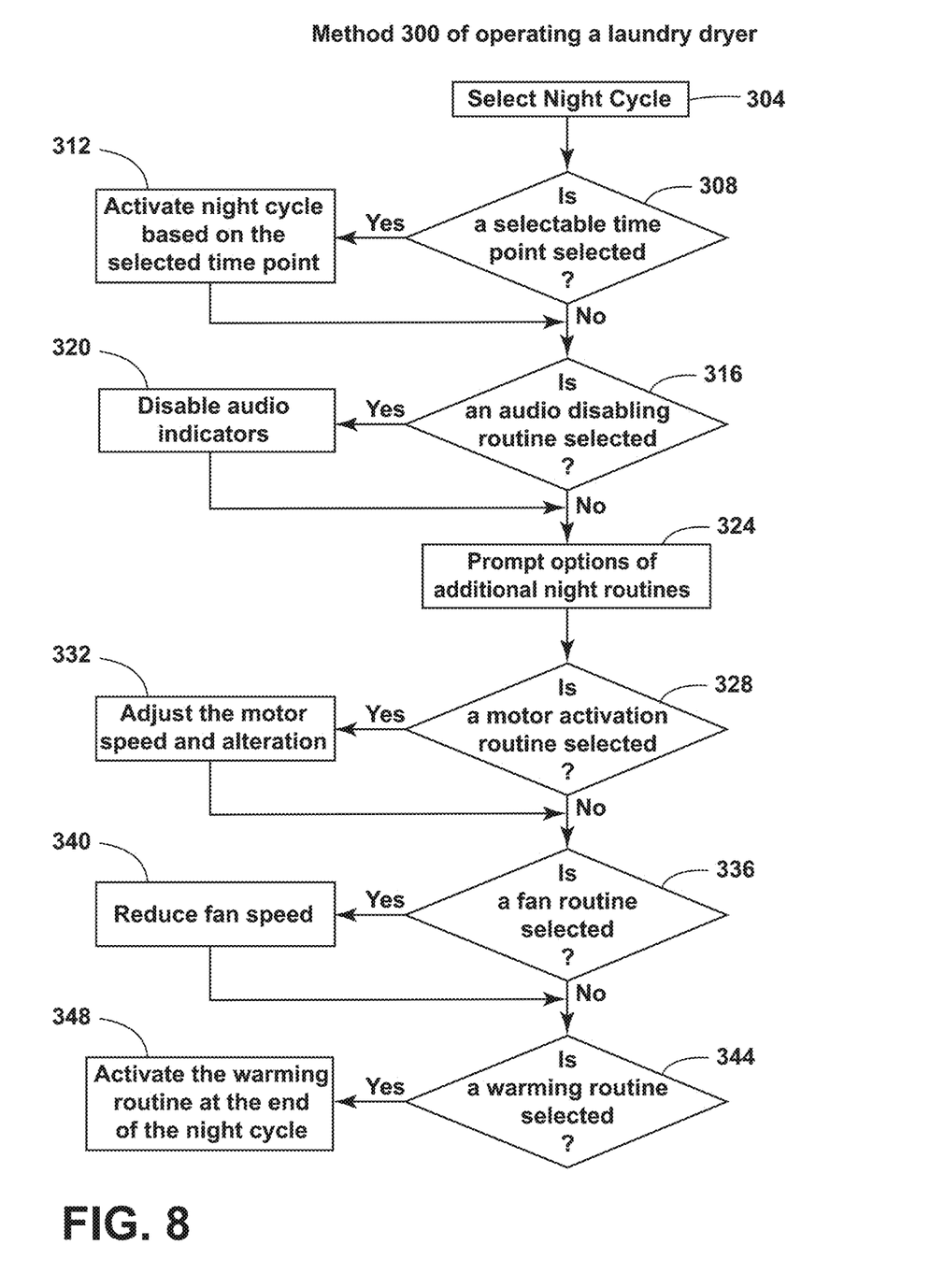
FIG. 8 is a flow diagram for a method of operating a laundry dryer using a night cycle of the present disclosure.
Figure 9:
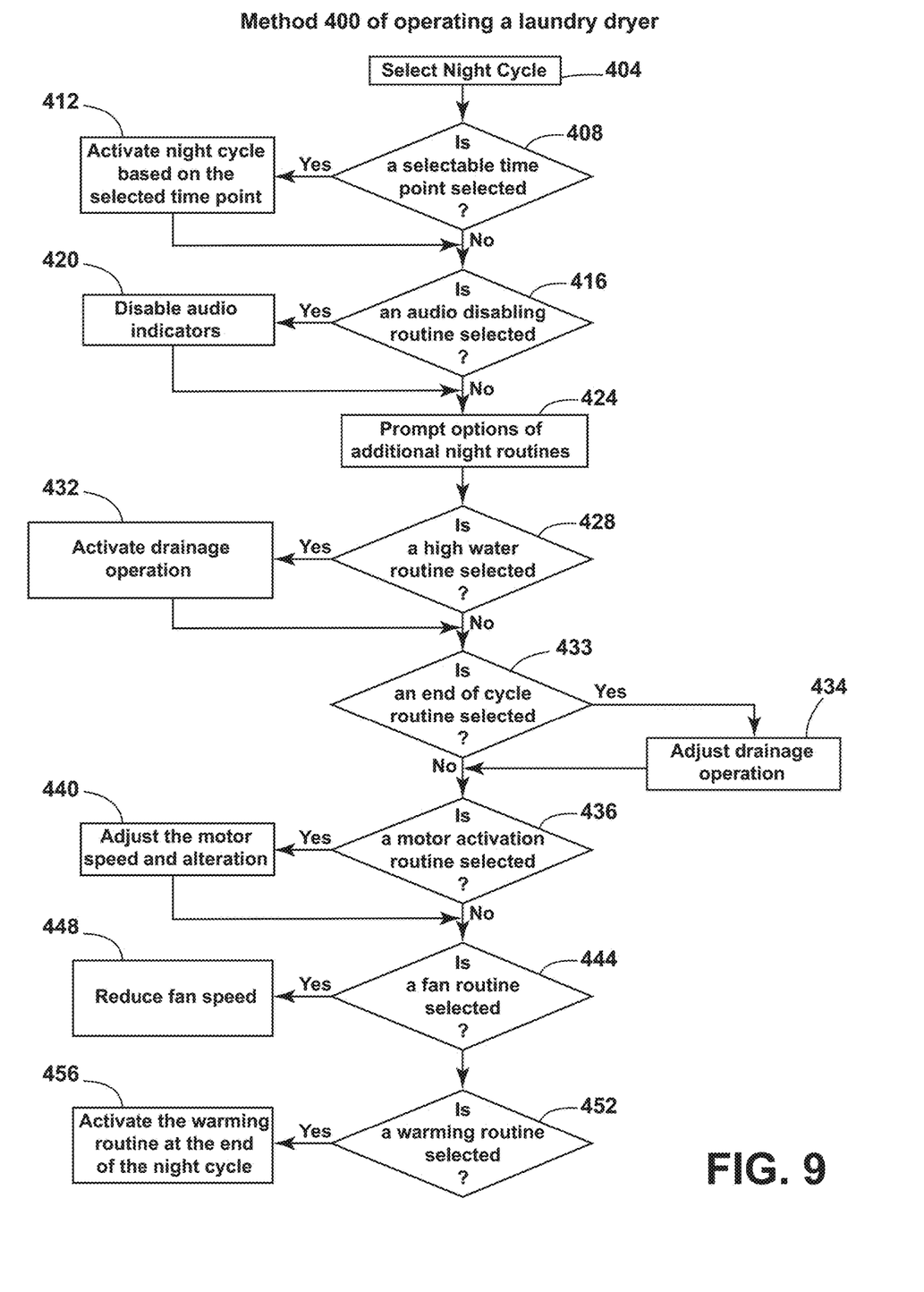
FIG. 9 is a flow diagram for a method of operating a laundry dryer using a night cycle of the present disclosure.
Figure 10:
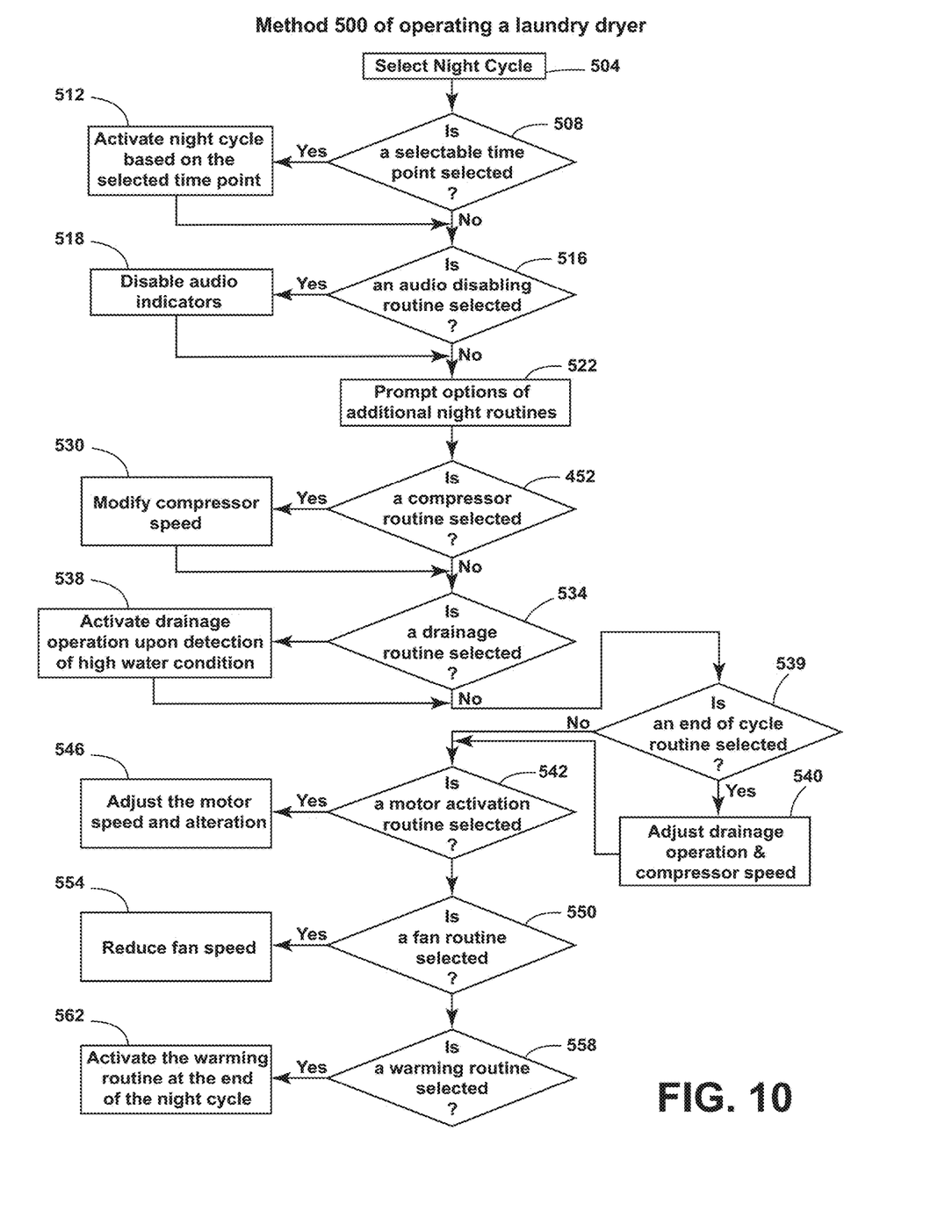
FIG. 10 is a flow diagram for a method of operating a laundry dryer using a night cycle of the present disclosure.

With reference now to FIGS. 2-7, the plurality of routines 24 of the night cycle 22 may also be referred to as a plurality of night routines 24 and/or night routines 24. The plurality of night routines 24 may include, but are not limited to, an end of cycle routine 98, a motor activation routine 100, an audio disabling routine 102, a drainage routine 104, a warming routine 106, a fan routine 108, and a compressor routine 110. The night routines 24 may also be configured with any combination of the end of cycle routine 98, the motor activation routine 100, the audio disabling routine 102, the drainage routine 104, the warming routine 106, the fan routine 108, and the compressor routine 110, depending on the configuration of the laundry dryer 10. For example, the laundry dryer 10 may be configured as an air vented laundry dryer, a condensing laundry dryer, a heat pump laundry dryer, and/or a hybrid heat pump laundry dryer. Each of the night routines 24 described with respect to FIGS. 3-7 may be configured in the memory storage 80 regardless of the configuration of the laundry dryer 10. It is generally contemplated that the laundry dryer 10 described with respect to FIG. 8 is contemplated as an air vented laundry dryer, described in more detail herein. The laundry dryer 10 described with respect to FIG. 9 is a condenser laundry dryer, described in more detail herein. The laundry dryer 10 described with respect to FIG. 10 is a heat pump and/or a hybrid heat pump laundry dryer, described in more detail herein.

With further reference to FIGS. 2-7, any one of the laundry dryers 10 described herein may include, at least, the end of cycle routine 98 and the audio disabling routine 102 and may also be configured with a selectable time point 112 that is communicatively coupled with the night routines 24 via the processor 82. The end of cycle routine 98 is configured to adjust the detection of an end of a laundry cycle as a result of the modifications described herein with respect to the night cycle 22. For example, a cool down portion of the night cycle 22 may be modified to accommodate the end of cycle routine 98. Stated differently, the end of cycle routine 98 may cooperate with the fan routine 108 via the controller 20, such that the fan routine 108 may reduce the respective speeds of the process fan 46a and the auxiliary fan 46b. The end of cycle routine 98 is configured to detect this alteration of fan speed to extend the overall length of the cycle to accommodate the rate change of the speeds of the various fans 46. In addition, the end of cycle routine 98 may be configured to cooperate with the drainage routine 104 to minimize the drainage during the cool down portion of the end of cycle routine 98.

With respect to the audio disabling routine, it is generally contemplated that the laundry dryer 10 is configured with the speaker 70, such that the user may be alerted to various operations of the laundry dryer 10 via the audio indicators 72. For example, the controller 20 may be communicatively coupled with the speaker 70 to project the audio indicators 72 at various time points during a laundry cycle. For example, the controller 20 may activate the end of cycle alert 74 in which the audio indicators 72 are activated to indicate to the user that the laundry cycle has completed.

The user may select the night cycle 22, and the controller 20 can display the option to select the audio disabling routine 102. Upon selection of the audio disabling routine 102, the controller 20 is configured to deactivate the audio indicators 72 to prevent audible alerts and/or noises associated with the various time points in the night cycle 22. For example, during the audio disabling routine 102, the end of cycle alert 74 can be silenced via the controller 20 and, in addition, the audio indicators 72 associated with the tactile indicia 58 are silenced. By way of example, not limitation, the selection of the audio disabling routine 102 may also result in the controller 20 silencing notifications and/or audio indicators 72 that may be otherwise enabled on the remote user device 86. For example, the remote user device 86 may be configured to receive the remote notifications 88 mentioned above that may utilize the audio indicators 72. The controller 20 may temporarily deactivate the communication circuitry 84, such that the notifications 88 typically associated with a laundry cycle are deactivated during the night cycle 22.

With further reference to FIGS. 2-7 and as mentioned herein, the audio disabling routine 102 of the night cycle 22 may be configured in the memory storage 80 of any of the above mentioned configurations of the laundry dryer 10. The audio disabling routine 102 may be activated at the selectable time point 112 mentioned above. The user may select a time point at which the audio disabling routine 102 may be activated that may correspond with the selectable time point 112. The selectable time point 112 is also configured within the memory storage 80 of the controller 20 and may be configured regardless of the configuration of the laundry dryer 10. As described in more detail below, the selectable time point 112 may be utilized for activation of the night cycle 22 in addition to separate and/or delayed activation of at least one of the night routines 24.

By way of example, not limitation, the selectable time point 112 may be associated with a selected start time by the user and/or a selected end time of the laundry cycle. The controller 20 can be configured to activate the laundry cycle based on the selectable time point 112. For example, the controller 20 may activate the laundry cycle based on the selectable time point 112, which may correspond with either a start time and/or an end time of the laundry cycle. It is generally contemplated that the selectable time point 112 may include a first time point 130 and a second time point 132. For example, the first time point 130 may correspond with an activation time of the night cycle 22. It is also contemplated that the controller 20 may activate at least one of the night routines 24 including, but not limited to, the audio disabling routine 102 once the first time point 130 is detected.

With further reference to FIGS. 2-7 and as mentioned above, the night cycle 22 and the night routines 24 are configured within the memory storage 80 of the controller 20. The controller 20 is configured to present the night routines 24 associated with the night cycle 22 on the display 66 of the user interface 14. For example, the controller 20 may display on the user interface 14 the option of any one of the night routines 24. It is generally contemplated that the controller 20 may reduce a backlight of the user interface 14, such that the display 66 and/or tactile indicia 58 may have a subtle appearance. It is further contemplated that the controller 20 may present on the user interface 14 the option to select additional routines from the night routines 24 upon selection of at least one of the night routines 24. The night routines 24 may be utilized in combination or individually depending on the selections made by the user. By way of example, and not limitation, the user may select both the motor activation routine 100 and the audio disabling routine 102, and the user interface 14 may prompt the selection of an additional routine 24 to be executed in combination with the motor activation routine 100 and the audio disabling routine 102.

Figure 4:
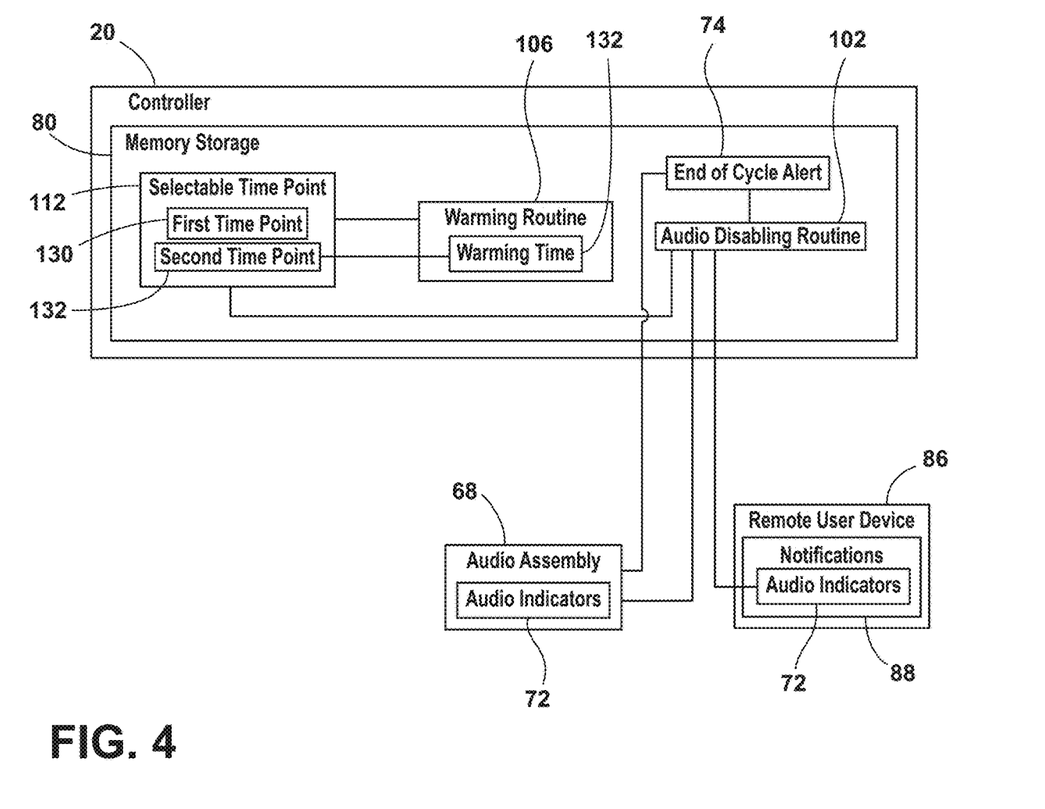
FIG. 4 is an exemplary schematic block diagram of a controller of the present disclosure with a selectable time point, a warming routine, and an audio disabling routine.
Figure 5:
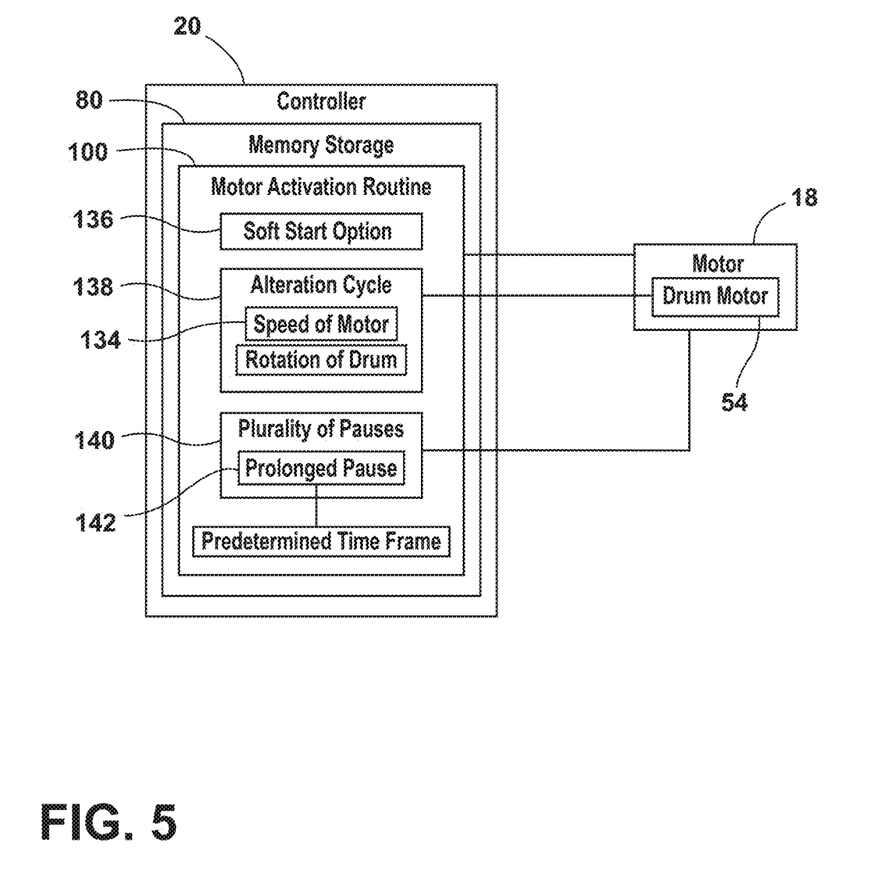
FIG. 5 is an exemplary schematic block diagram of a controller with a motor activation routine of a night cycle algorithm of the present disclosure.

With further reference to FIGS. 2-7, the motor activation routine 100 is also configured within the memory storage 80 of the laundry dryer 10. As schematically illustrated in FIGS. 3 and 5, the motor activation routine 100 is configured to minimize a speed 134 of the motor 18. The controller 20 is configured to alter the speed 134 of the motor 18 upon selection of the motor activation routine 100. For example, the controller 20 is configured to alter the speed 134 of the motor 18 to dry clothing items at a slower rate. In addition, the motor activation routine 100 may be configured with a soft start option 136. The soft start option 136 is configured to minimize the noise associated with the step changes in the motor 18. The soft start option 136 assists in reducing the steady-state operating speed 134 of the motor 18, In addition, it is contemplated that the motor activation routine 100 may minimize potential reversing of the drum 16 during the night cycle 22. Additionally or alternatively, the selection of the soft start option 136 may be utilized to execute soft start during potential reversing of the drum 16.

It is generally contemplated that the soft start option 136 may be configured with each of the fan routine 108 and the compressor routine 110. In such configurations, the soft start option 136 may be utilized to slowly activate the fan 46 and/or compressor 50 functions to minimize the noise associated with activation of the fan 46 and the compressor 50. It is also contemplated that the selectable time point 112 may be utilized, such that the first time point 130 may be an end time for the night cycle 22. In such configuration, the controller 20 is configured to start the night cycle 22 at a time point sufficient to execute the various routines 24 by the first time point 130. The alteration of the speed 134 of the motor 18 is accounted for when the controller 20 starts the night cycle 22 when the motor activation routine 100 is selected along with the selection of the first time point 130.

The motor activation routine 100 may also be configured to decrease and/or increase pausing during the night cycle 22. The motor activation routine 100 may be configured with an alteration cycle 138, such that the controller 20 is configured to prolong phases of activation and deactivation of the motor 18 to reduce the alteration of the motor from activation to deactivation. The option to select the alteration cycle 138 may be presented to the user on the user interface 14 when the user selects the motor activation routine 100. Additionally or alternatively, the alteration cycle 138 may increase the duration of the pause to define a plurality of pauses 140, described as an alternate configuration below. The controller 20 can be configured to execute both minimizing the speed of the motor 18 and alteration of the pauses of the motor 18 when the motor activation routine 100 is selected.

In an alternate configuration, the motor activation routine 100 may be configured to prolong the plurality of pauses 140 to define prolonged pauses 142 that occur during a rotational phase of the drum 16 (FIG. 1). For example, the controller 20 may be configured to prolong the plurality of pauses 140 by slowing or stopping the motor 18 for a predetermined time frame. In either configuration, prolonged activation of the motor 18 and/or prolonged pausing of the motor 18 is configured to minimize the change in the noise associated with operation of the laundry dryer 10. It is generally contemplated that prolonged consistent noise and/or absence of noise may minimize disruption of a user during operation of the night cycle 22.

With further reference to FIGS. 2-7, the memory storage 80 of the laundry dryer 10 may also be configured with the warming routine 106. The warming routine 106 is communicatively configured with the selectable time point 112 and is activated via the controller 20. The user may select the warming routine 106 from the night routines 24, and the second time point 132 of the selectable time point 112 may correspond with a warming time. For example, the night cycle 22 may end prior to the preselected warming time 132, such that the controller 20 can activate the warming routine 106 once the second time point 132 is reached. The warming time 132 may also be associated with a time point at which the user may retrieve the warmed clothing items. Stated differently, the warming routine 106 may be added at the end of the night cycle 22 and/or may be activated at a later time point after completion of the night cycle 22.

The warming routine 106 is configured to provide the user with warm clothing items relative to the selected warming time 132. For example, the user may select the night cycle 22 to have the first time point 130 associated with the activation time and also select the warming routine 106 within the night cycle 22 to be executed at the second time point 132. As mentioned above, the second time point 132 may be set at a time that is later than the end time of the night cycle 22. Upon selection of the warming routine 106, the controller 20 is configured to activate the night cycle 22 in coordination with the second time point 132. In this way, after completion of the night cycle 22, the user can be provided with warmed and refreshed articles as a result of the warming routine 106 that is initiated and competed after the second time point 132 of the night cycle 22.

With further reference to FIGS. 2-7, the laundry dryer 10 may be configured with the drainage routine 104. The drainage routine 104 includes a high water routine 146 and a time-based routine 148. It is generally contemplated that the drainage routine 104 of the night cycle 22 minimizes the activation of the drain motor 56 to reduce the overall noise associated with a drainage operation 150 of the laundry dryer 10. During the high water routine 146, the controller 20 is configured to detect a high water condition 152 of the laundry dryer 10. The drainage routine 104 is configured to adjust the drainage operation 150 of the laundry dryer 10 via the controller 20. The controller 20 is configured to detect the high water condition 152 and will activate the drain motor 56 to flush the water from the laundry dryer 10 via the drain 52. The drain motor 56 is activated by the controller 20 in response to detecting the high water condition 152 within the laundry appliance 10. The drainage routine 104 of the night cycle 22 minimizes the overall activation points of the drainage operation 150 to minimize the drainage noise associated with the drainage operation 150.

The time-based routine 148 is configured to activate the drainage operation 150 at predetermined time points. The time-based routine 148 is configured so the drainage operation 150 is executed at time points optimized for drainage while minimizing the noise associated with the drainage operation 150. In addition, the controller 20 may be communicatively coupled with a sensor configured to detect the high water condition 152. The sensor may communicate the high water condition 152 with the controller and the controller 20 may utilize the information from the sensor to activate the drainage routine 104. The detection and activation of the drainage routine 104 may be informed based on energy variation feedback and the overall wattage utilized by the drain pump. The controller 20 may modify the drainage routine 104 accordingly to minimize the overall noise associated with the drainage operation 150. It is further contemplated that the drainage routine 104 may be configured to halt the drainage operation 150, such that the water is configured to carryover to a subsequent cycle to minimize the noise associated with the drainage operation 150.

Referring again to FIGS. 2-7, the laundry dryer 10 may also be configured with the fan routine 108 and the compressor routine 110. The fan routine 108 and the compressor routine 110 are also configured within the memory storage 80 of the controller 20 of the laundry dryer 10. The fan routine 108 may be activated with and/or operational along with the compressor routine 110. It is generally contemplated that selection of the fan routine 108 can result in a reduction of a speed 160 of the compressor 50 to minimize the time during which the compressor 50 is operational. Additionally or alternatively, the fan routine 108 may be associated with the restriction of a speed 162 of the fan 46 during the night cycle 22. In either configuration, the fan routine 108 is configured to minimize the overall noise associated with the fan 46 of the laundry dryer 10 during the night cycle 22.

For example, the fan routine 108 may be configured to reduce the speed 162 of a fan motor 164, which may reduce the noise associated with the fan 46 separate from the operation of the drum 16. Stated differently, the fan routine 108 may modify the fan motor 164 while the motor 18 remains unaffected by the fan routine 108. In addition, the auxiliary fan 46b may assist in maintaining the temperature during the night cycle 22 may minimizing the deactivation of the compressor 50. The fan routine 108 may cooperate with the compressor routine 110 to adjust the speed 160 of the compressor 50 to maintain the temperature during the night cycle 22. The compressor routine 110 is configured to reduce the speed 160 of the compressor 50 during the night cycle 22 to minimize the operational noise associated with the compressor 50. Stated differently, the speed 160 of the compressor 50 is reduced, such that the overall noise associated with the night cycle 22 of the laundry dryer 10 is minimized. In addition, the compressor routine 110 may be configured to maintain the temperature within the laundry appliance 10 independently of the auxiliary fan 46b. The compressor routine 110 may be configured to regulate the speed 160 of the compressor to regulate the temperature while the auxiliary fan 46b may be switched off to minimize noise associated with the auxiliary fan 46b.

Referring again to FIGS. 1-8, a method 300 for operating a laundry appliance 10 includes the following steps. It is generally contemplated that the laundry appliance 10 described with respect to FIG. 8 is an air vented laundry dryer. A night cycle 22 of a memory storage 80 is selected via a controller 20 (step 304). The user may select a selectable time point 112 via the user interface 14 (decision step 308). If the user selects the selectable time point 112, then the controller 20 can activate the night cycle 22 based on the selected time point (step 312). The user may select an audio disabling routine 102 (decision step 316). If the user selects the audio disabling routine 102, then the controller 20 will silence all audio indicators 72 associated with the night cycle 22 (step 320). The controller 20 may then display all of the night routines 24 on the user interface 14 to present the user with the programmed routine options (step 324).

The user may select a motor activation routine 100 (decision step 328). If selected, the controller 20 may adjust the speed 134 of the motor 18 and/or the rotational alteration of the motor 18 (step 332). The user may also select a fan routine 108 (decision step 336). If selected, the controller 20 will reduce the speed 162 of the fan 46 to reduce the noise associated with the operation of the fan 46 (step 340).

Finally, the user may select a warming routine 106 (decision step 344). If selected, the controller 20 can activate the warming routine 106 at an end of the night cycle 22 (step 348). It is generally contemplated that the user may select any one of the above routines 24 during operation of the night cycle 22 in any combination.

Referring again to FIGS. 1-7 and 9, a method 400 for operating a laundry appliance 10 includes the following steps. It is generally contemplated that the laundry appliance 10 described with respect to FIG. 9 is a condenser laundry dryer. A night cycle 22 of a memory storage 80 is selected via a controller 20 (step 404). The user may select a selectable time point 112 via the user interface 14 (decision step 408). If the user selects the selectable time point 112, then the controller 20 can activate the night cycle 22 based on the selected time point (step 412). The user may select an audio disabling routine 102 (decision step 416). If the user selects the audio disabling routine 102, then the controller 20 will silence all audio indicators 72 associated with the night cycle 22 (step 420). The controller 20 may then display all of the night routines 24 on the user interface 14 to present the user with the programmed routine options (step 424).

The user may select a drainage routine 104 (decision step 428). If selected, the controller 20 will activate the drainage operation 150 (step 432). For example, the controller 20 may activate the drainage operation 150 upon detection of a high water condition 152. Additionally or alternatively, the controller 20 may activate the drainage operation at a predetermined time in the night cycle 22. The user may also select an end of cycle routine 98 that cooperates with the drainage routine 104 to adjust the drainage operation (step 434). The user may select a motor activation routine 100 (decision step 436). If selected, the controller 20 may adjust the speed 134 of the motor 18 and/or the rotational alteration of the motor 18 (step 440). The user may also select a fan routine 108 (decision step 444). If selected, the controller 20 will reduce the speed 162 of the fan 46 to reduce the noise associated with the operation of the fan 46 (step 448). Finally, the user may select a warming routine 106 (decision step 452). If selected, the controller 20 can activate the warming routine 106 at an end of the night cycle 22 (step 456). It is generally contemplated that the user may select any one of the above routines 24 during operation of the night cycle 22 in any combination.

Referring again to FIGS. 1-7 and 10, a method 500 for operating a laundry appliance 10 includes the following steps. It is generally contemplated that the laundry appliance 10 described with respect to FIG. 10 is a heat pump and/or hybrid heat pump laundry dryer. A night cycle 22 of a memory storage 80 is selected via a controller 20 (step 504). The user may select a selectable time point 112 via the user interface 14 (decision step 508). If the user selects the selectable time point 112, then the controller 20 can activate the night cycle 22 based on the selected time point (step 512). The user may select an audio disabling routine 102 (decision step 516). If the user selects the audio disabling routine 102, then the controller 20 will silence all audio indicators 72 associated with the night cycle 22 (step 518). The controller 20 may then display all of the night routines 24 on the user interface 14 to present the user with the programmed routine options (step 522).

The user may select a compressor routine 110 (decision step 526). If selected, the controller 20 may reduce the speed 160 of the compressor 50 to minimize the noise associated with operation of the compressor 50 (step 530). The user may select a drainage routine 104 (decision step 534). If selected, the controller 20 will activate the drainage operation 150 (step 538). For example, the controller 20 may activate the drainage operation 150 upon detection of a high water condition 152. Additionally or alternatively, the controller 20 may activate the drainage operation at a predetermined time in the night cycle 22. The user may also select an end of cycle routine 98 that cooperates with the drainage routine 104 to adjust the drainage operation 150 and the compressor routine 110 to adjust the speed of the compressor 50(step 540). The user may select a motor activation routine 100 (decision step 542). If selected, the controller 20 may adjust the speed 134 of the motor 18 and/or the rotational alteration of the motor 18 (step 546). The user may also select a fan routine 108 (decision step 550). If selected, the controller 20 will reduce the speed 162 of the fan 46 to reduce the noise associated with the operation of the fan 46 (step 554). Finally, the user may select a warming routine 106 (decision step 558). If selected, the controller 20 can activate the warming routine 106 at an end of the night cycle 22 (step 562). It is generally contemplated that the user may select any one of the above routines 24 during operation of the night cycle 22 in any combination.

Referring again to FIGS. 1-10, the night cycle 22 and the corresponding night routines 24 assist the user in completing laundry cycles with minimal noise disruption. Each of the night routines 24 are configured to reduce the noise associated with the operation of the laundry appliance 10, for example, disabling the audio indicators 72 associated with various time points in the laundry cycle. In addition, the incorporation of the selectable time points 112 assists the user in activating the night cycle 22 while the user may be sleeping or otherwise away from the laundry appliance 10. The user may utilize the selectable time point 112 to set the activation time 130 to initiate the night cycle 22, which may further assist in minimizing noise disruption as the user may be asleep during the activation time 130. It is generally contemplated that the user may stop or alter the night cycle 22 at any point during execution of the night cycle 22. It is also contemplated that the night routines 24 and night cycle 22 may be selected by the user during any time point and is not limited only to nighttime use.

The invention disclosed herein is further summarized in the following paragraphs and is further characterized by combinations of any and all of the various aspects described therein.

According to one aspect of the present disclosure, a laundry appliance includes a cabinet including a user interface, a drum that is disposed within the cabinet, a motor that is disposed within the cabinet and is operably coupled to the drum, and a controller that is communicatively coupled with the user interface and the motor. The controller includes a night cycle algorithm that is configured to minimize operational noise of the motor and the drum. The controller is configured to select from a plurality of routines of the night cycle algorithm.

According to another aspect, a plurality of routines includes a motor activation routine that is configured with a soft start option. The controller is configured to reduce a speed of a motor upon selection of the motor activation routine.

According to another aspect, a plurality of routines includes an audio disabling routine, and tactile indicia of a user interface and an end of cycle alert each include audio indicators that are silenced via a controller during the audio disabling routine.

According to another aspect, a night cycle algorithm is configured to adjust a drainage operation of a drum via a controller. The night cycle algorithm includes a drainage routine that includes at least one of a high water routine and a time-based routine during which the controller is configured to activate the drainage operation.

According to another aspect, a night cycle algorithm includes selectable time points. A controller activates a motor based on the selectable time points.

According to another aspect, a night cycle algorithm includes a warming routine of a plurality of routines, and a controller activates the warming routine based on at least one time point of selectable time points.

According to another aspect, a laundry appliance further includes a fan that is operably coupled to a drum and includes a fan motor. A night cycle algorithm is configured to decrease a speed of the fan motor via a controller.

According to another aspect of the present disclosure, a laundry dryer includes a cabinet, a user interface that is operably coupled to the cabinet, a motor that is disposed within the cabinet and communicatively coupled with the user interface, and a controller that is communicatively coupled with the user interface and the motor, respectively. The controller includes a memory storage that includes a plurality of night routines. The controller is configured with a selectable time point and is further configured to select at least one of the plurality of night routines at the selectable time point.

According to another aspect, a selectable time point includes a first time point and a second time point. The first time point is an activation time and the second time point is a warming time.

According to another aspect, a plurality of night routines includes an audio disabling routine, and tactile indicia of a user interface and an end of cycle alert are silenced during the audio disabling routine.

According to another aspect, at least one of the plurality of night routines includes a high water routine. A controller is configured to detect a high water condition and a memory storage is configured with the high water condition.

According to another aspect, at least one of a plurality of routines includes an end of cycle routine that is configured to adjust a detection of an end of a laundry cycle in response to a plurality of night routines.

According to another aspect, at least one of the plurality of routines includes a motor activation routine that includes an alteration cycle and is configured to reduce a speed of the motor via a controller, and the controller is configured to prolong activation of a motor during the alteration cycle.

According to another aspect, a motor activation routine includes a plurality of pauses, and a controller is configured to prolong the plurality of pauses by stopping a motor for a predetermined time frame.

According to another aspect, a laundry dryer further includes a compressor that is operably coupled to a motor and communicatively coupled with a controller. The controller is configured to reduce a speed of a compressor upon activation of at least one of a plurality of night routines.

According to another aspect, a laundry dryer further includes a fan that is communicatively coupled with a controller. A plurality of night routines includes a fan routine that is configured to reduce a speed of the fan via the controller.

According to yet another aspect of the present disclosure, a method for operating a laundry appliance includes selecting a night cycle of a memory storage via a controller, and adjusting a laundry cycle of the memory storage to the night cycle via the controller. Adjusting the laundry cycle to the night cycle includes activating at least one night routine. The method further includes disabling audio indicators via the controller including at least one of an end of cycle alert and remote notifications, and activating at least one of the night routines. The night routines includes at least one of detecting a high water condition, reducing motor speed, and reducing alteration of motor activation.

According to another aspect, a night routine of detecting a high water condition includes activating a drain motor upon detection of the high water condition.

According to another aspect, a night routine of reducing alteration of motor activation includes reducing pauses of a motor during a night cycle.

According to another aspect, night routines further include at least one of reducing a speed of a compressor and reducing a speed of a fan. The night routines are configured to minimize noise of said laundry appliance during a night cycle.

It will be understood by one having ordinary skill in the art that construction of the described disclosure and other components is not limited to any specific material. Other exemplary embodiments of the disclosure disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the disclosure as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present disclosure. The exemplary structures and processes disclosed herein are for illustrative purposes and are not to be construed as limiting.

What is claimed is:

1. A laundry appliance, comprising:
   a cabinet including a user interface;
   a drum disposed within the cabinet;
   a motor disposed within the cabinet and operably coupled to the drum; and
   a controller communicatively coupled with the user interface and the motor, wherein the controller includes a night cycle algorithm configured to minimize operational noise of the motor and the drum, and wherein the controller is configured to select from a plurality of routines of the night cycle algorithm, wherein the night cycle algorithm is configured to adjust a drainage operation of the drum via the controller, and wherein the night cycle algorithm includes a drainage routine that includes at least one of a high water routine and a time-based routine during which the controller is configured to activate the drainage operation.

2. The laundry appliance of claim 1, wherein the plurality of routines includes a motor activation routine configured with a soft start option, and wherein the controller is configured to reduce a speed of the motor upon selection of the motor activation routine.

3. The laundry appliance of claim 1, wherein the plurality of routines includes an audio disabling routine, and wherein tactile indicia of the user interface and an end of cycle alert each include audio indicators that are silenced via the controller during the audio disabling routine.

4. The laundry appliance of claim 1, wherein the night cycle algorithm includes selectable time points, and wherein the controller activates the motor based on the selectable time points.

5. The laundry appliance of claim 4, wherein the night cycle algorithm includes a warming routine of the plurality of routines, and wherein the controller activates the warming routine based on at least one time point of the selectable time points.

6. The laundry appliance of claim 1, further comprising a fan operably coupled to the drum and including a fan motor, respectively, and wherein the night cycle algorithm is configured to decrease a speed of the fan motor via the controller.

7. A laundry dryer, comprising:
   a cabinet;
   a user interface operably coupled to the cabinet;
   a motor disposed within the cabinet and communicatively coupled with the user interface; and
   a controller communicatively coupled with the user interface and the motor, respectively, wherein the controller includes a memory storage that includes a plurality of night routines, and wherein the controller is configured with a selectable time point and configured to select at least one of the plurality of night routines at the selectable time point, wherein at least one of the plurality of night routines includes a motor activation routine that includes an alteration cycle and is configured to reduce a speed of the motor via the controller, and wherein the controller is configured to prolong activation of the motor during the alteration cycle.

8. The laundry dryer of claim 7, wherein the selectable time point includes a first time point and a second time point, and wherein the first time point is an activation time and the second time point is a warming time.

9. The laundry dryer of claim 7, wherein the plurality of night routines includes an audio disabling routine, and wherein tactile indicia of the user interface and an end of cycle alert are silenced during the audio disabling routine.

10. The laundry dryer of claim 7, wherein at least one of the plurality of night routines includes a high water routine, and wherein the controller is configured to detect a high water condition and the memory storage is configured with the high water condition.

11. The laundry dryer of claim 7, wherein at least one of the plurality of night routines includes an end of cycle routine configured to adjust a detection of an end of a laundry cycle in response to the plurality of night routines.

12. The laundry dryer of claim 11, wherein the motor activation routine includes a plurality of pauses, and wherein the controller is configured to prolong the plurality of pauses by stopping the motor for a predetermined time frame.

13. The laundry dryer of claim 7, further comprising:
a compressor operably coupled to the motor and communicatively coupled with the controller, wherein the controller is configured to reduce a speed of the compressor upon activation of at least one of the plurality of night routines.

14. The laundry dryer of claim 7, further comprising:
a fan communicatively coupled with the controller, wherein the plurality of night routines include a fan routine configured to reduce a speed of the fan via the controller.

15. A method for operating a laundry appliance, comprising:
selecting a night cycle of a memory storage via a controller;
adjusting a laundry cycle of the memory storage to the night cycle via the controller, wherein adjusting the laundry cycle to the night cycle includes activating at least one night routine of a plurality of night routines to minimize operational noise;
disabling audio indicators via the controller including at least one of an end of cycle alert and remote notifications; and
activating the at least one night routine, where the plurality of night routines includes at least one of:
detecting a high water condition;
reducing motor speed to prolong a duration of the laundry cycle of the night cycle; and
reducing alteration of motor activation to decrease a number of activations of a motor and prolong each of the activations of the motor.

16. The method of claim 15, wherein the motor is a drain motor, and wherein the plurality of night routines of detecting the high water condition includes activating the drain motor upon detection of the high water condition to minimize the activations of the drain motor.

17. The method of claim 15, wherein the plurality of night routines of reducing the alteration of the motor activation includes reducing a number of pauses of the motor during the night cycle and increasing a pause duration of the number of pauses of the motor.

18. The method of claim 15, wherein the plurality of night routines further include at least one of:
reducing a speed of a compressor; and
reducing a speed of a fan, wherein the plurality of night routines are configured to minimize noise of said laundry appliance during the night cycle.

* * * * *